United States Patent [19]
Lindblad

[11] Patent Number: 5,588,932
[45] Date of Patent: Dec. 31, 1996

[54] DEVICE FOR THE SETTING OF THE MUTUAL POSITIONS OF PIVOTABLE ELEMENTS

[75] Inventor: Lennart Lindblad, Vårgårda, Sweden

[73] Assignee: Linvent AB, Vargarda, Sweden

[21] Appl. No.: 362,593

[22] PCT Filed: May 27, 1993

[86] PCT No.: PCT/SE93/00470

§ 371 Date: Dec. 27, 1994

§ 102(e) Date: Dec. 27, 1994

[87] PCT Pub. No.: WO94/00314

PCT Pub. Date: Jan. 6, 1994

[30] Foreign Application Priority Data

Jun. 29, 1992 [SE] Sweden ................... 9201988

[51] Int. Cl.[6] ................... F16H 57/08
[52] U.S. Cl. ................... 475/341; 475/342
[58] Field of Search ................... 475/338, 341, 475/342, 346; 297/362

[56] References Cited

U.S. PATENT DOCUMENTS

| | | | |
|---|---|---|---|
| 4,211,451 | 7/1980 | Shephard . | |
| 4,237,750 | 12/1980 | Takahashi | 475/337 |
| 4,345,792 | 8/1982 | Shephard | 475/342 X |
| 4,576,412 | 3/1986 | Terada | 297/362 |
| 4,773,704 | 9/1988 | Engels | 297/362 |
| 4,781,415 | 11/1988 | Heesch et al. | 297/362 |
| 5,090,771 | 2/1992 | Kawakita | 475/342 X |
| 5,098,359 | 3/1992 | Chales et al. . | |
| 5,183,447 | 2/1993 | Kawakita | 475/341 |
| 5,254,055 | 10/1993 | Kawakita et al. | 475/341 |
| 5,368,363 | 11/1994 | Sakamoto | 475/341 X |
| 5,462,498 | 10/1995 | Lindblad | 475/342 |

FOREIGN PATENT DOCUMENTS

| | | |
|---|---|---|
| 0332340 | 9/1989 | European Pat. Off. . |
| 2539023 | 12/1979 | Germany . |
| 2248481 | 4/1992 | United Kingdom . |
| 2257035 | 1/1993 | United Kingdom . |

*Primary Examiner*—Charles A. Marmor
*Assistant Examiner*—Peter Kwon
*Attorney, Agent, or Firm*—Dvorak and Traub

[57] ABSTRACT

The invention concerns a setting device for adjustment of the angular relative position of two components that are pivotable with respect to one another by means of planet wheels distributed along fear tracks formed is said pivotable components and arranged to roll on said gear tracks, the engagement of the teeth of said planet wheels being so adapted that upon the rolling of said planet wheels on said tracks the two pivotable components will be imparted a relative turning movement. In accordance with the invention the planet wheels are supported so as to be allowed radial movement and means are provided to urge the planet wheels radially into contact with the gear tracks.

9 Claims, 5 Drawing Sheets

DEVICE FOR THE SETTING OF THE MUTUAL POSITIONS OF PIVOTABLE ELEMENTS

BACKGROUND OF THE INVENTION

The subject invention concerns a device for setting the relative positions of pivotable elements, such as setting the position of inclination of the back rest of a seat, preferably a vehicle seat, comprising pivot components disposed in pairs for mutual rotational movement and arranged to be associated for instance with the back rest and with the seat cushion part, respectively of the seat, each component of said pair being formed with at least one of concentric side by side ring gears and with a number of planetary wheel gears spaced about the associated ring gear circumference with each such planetary gear wheel simultaneously engaging the two ring gears, said planetary gear wheels and said ring gears being mutually adapted to cause the ring gears and the associated rotational components to perform a relative angular movement upon rolling of the planetary gear wheels in mesh with the ring gears.

In devices of the kind defined above it is often of very great importance that the components of the joint be kept together in a very stable manner, without play or free slack.

The main purpose of the invention is to provide a device of this kind, in which the pivot components of the joint are efficiently kept together in such a manner that no play occurs.

This purpose is achieved by means of a device in accordance with the invention, in which the planetary gear wheels are supported so as to move radially and in which means are provided to urge the planetary gear wheels radially outward into contact with the ring gears.

Preferably, the planetary gear wheels are spring biased in the direction towards the ring gears.

In addition, the planetary gear wheels preferably are interconnected by means of planetary gear carriers of a resilient material. In accordance with one preferred embodiment of the invention the planetary gear carriers are shaped as annular members formed with planetary gear wheel bearing means spaced around the periphery of the annular member.

In addition, the planetary gear wheel shaft bearing means preferably are formed by the cooperation between peripheral grooves formed in the planetary gear wheel shafts and edge portions of the planetary gear carriers in engagement with said grooves.

Preferably, the planetary wheel gear carriers are each formed by an essentially circular ring-shaped spring member, the periphery of which is biased into nesting engagement with said grooves formed in the end portions of the planet wheel bearing shafts, thus forming a race cooperating with the bottom faces of the shaft grooves.

In addition, means preferably are provided to at least partially counteract, i.e. annul the contact pressure exerted on the planetary gear wheels during setting, i.e. during the pivotal movement of the pivot components.

Furthermore, the means arranged to counteract the contact pressure preferably could be operatively connected with the actuating means designed to set the positions of the pivot components for the purpose of diverting the actuating force in a direction acting oppositely to the contact pressure.

The pivot components or components of the articulated or pivotable joint preferably are plates arranged in abutting relationship, each one having two concentric apertures the periphery of which forms the associated gear ring, the two plates being retained one against the other by means of abutment against its associated one of external flat faces and kept together with spacer members positioned between the planetary gear wheels and bridging the thickness of the fittings.

Preferably, the spacer members are formed with external faces in abutment against the ring gear tooth apices and forming sliding tracks on which slide said apices for the purpose of maintaining the concentric relationship of the gear tracks.

BRIEF DESCRIPTION OF THE DRAWINGS

Several embodiments of the invention will now be described with reference to the accompanying drawings, wherein.

DETAILED DESCRIPTION OF THE PREFERRED EMBODIMENT

Figure 2:
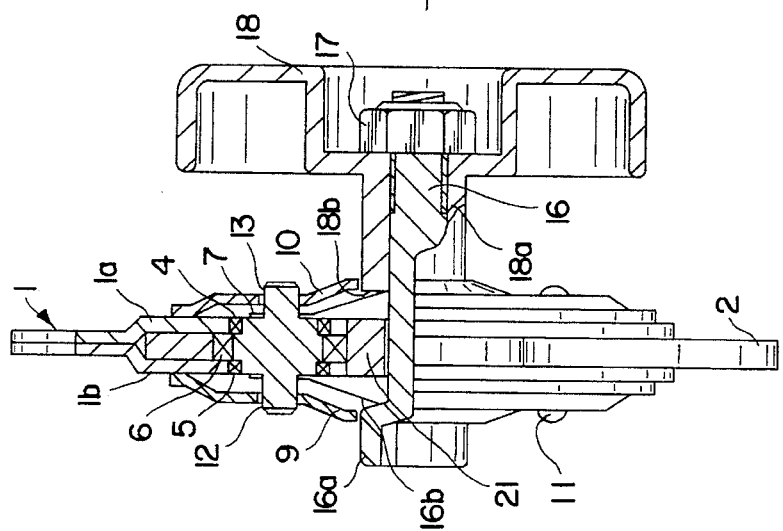
FIG. 2 illustrates the same fitting as seen from the right-hand side with respect to FIG. 1, the lower part being shown in a lateral view and the upper part in cross-section.
Figure 1:
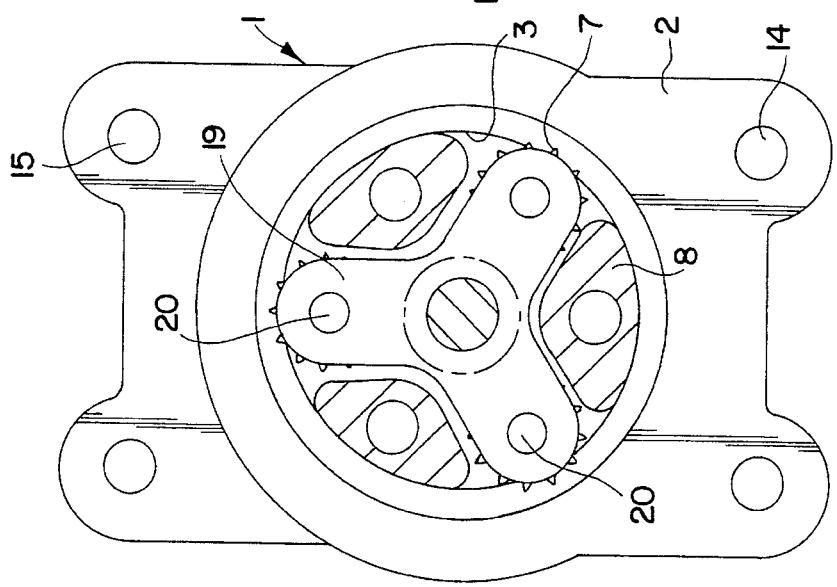
FIG. 1 is a partly cut lateral view through the articulated fitting in accordance with a first embodiment of the invention

The pivot fitting illustrated in FIGS. 1 and 2 consists of two pivot components, which are arranged for mutual rotational movement relatively to one another in the plane of the drawing FIG. 1. Pivot component 1 consists of two mutually spaced apart plates 1a and 1b sandwiching between them the second pivot component 2, the latter also being of plate configuration in accordance with the embodiment shown. All plates 1a, 1b and 2 are formed with openings arranged in co-axial relationship, the opening formed in component 2 appearing from FIG. 1 wherein it is designated by reference 3. Along the periphery of the opening, component 1*a* is formed with a ring gear 4 and pivot component 1*b* with a ring gear 5 whereas also opening 3 is formed along its periphery with a ring gear 6. Corresponding ring gears formed on a number of planetary gear wheels 7, in the example shown three such geared wheels, mesh with the three ring gears 4, 5 and 6. In accordance with the example shown the ring gear 6 is of larger diameter size than ring gears 4 and 5, and consequently the center gear of the planetary gear wheels also has a larger diameter size than the two outer gear rings. This difference in diameter sizes causes the pivot components 1 and 2 to rotate relatively to one another as the planetary gear wheels are driven along the ring gears of the two pivot components. A gear ratio of this kind could, of course, be obtained in variety of different ways known per se by a suitable choice of the number of teeth, diameter size and cog tooth module of the individual ring gears. Numeral reference 8 designates a number of spacer elements, three in accordance with the shown example, the thickness of which approximately corresponds to the total thickness of the two pivot components 1 and 2, the spacer elements thus bridging the space, from side to side, between two end discs 9 and 10 placed externally of the pivot components. The end discs preferably are kept together by means of rivets 11 or other suitable interconnecting members extending through the spacer elements 8 add the end discs 9, 10. In accordance with the embodiment shown, the shafts 20 of the planetary gear wheels extend through apertures 12, 13 in the end discs 9 and 10, respectively so as to project beyond the latter. The extent of the apertures 12, 13 radially exceeds the shaft diameter size of the planetary gear wheels, thus imparting a limited freedom of movement the radial sense.

In accordance with the embodiment shown in FIG. 2, the two pivot component discs 1*a* and 1*b* are joined together by means of bending in the areas thereof positioned externally of the pivot component disc 2. In accordance with the embodiment shown, the pivot component discs are formed at their extremities with fastening apertures 14 and 15, respectively, allowing the fitting to be secured to the elements that are to be pivotally interconnected, such as for instance the cushion part and the back rest part of a vehicle seat. Numeral reference 16 designates a center shaft which is formed at the left-hand side according to FIG. 2 with an enlarged portion or boss 16*a* which in the area of its transition to the narrower part of the center shaft forms a shoulder 16*b*. Onto the right-hand part of the center shaft as seen in FIG. 2, which shaft part is formed with threads, is screwed a nut 17 centrally supporting a manually operated hand wheel 18 formed with a hub portion 18*a* extending along the shaft 16 and arranged to be fitted onto the latter. The left end of the hub, as seen in FIG. 2, forms another shoulder 18*b*. A sun gear wheel 21 is non-rotationally secured to the shaft 16 and drivingly meshes with the planetary gear wheels 7 disposed around the sun wheel gear circumference. Numeral reference 19 preferably designates two planetary gear carriers positioned one on either side of the planetary gear wheels internally of the end discs 9, 10. The planetary gear carriers 19 preferably consist of a resilient material and centrally they are formed with through-holes through which extends the center shaft 16, and they are also formed with through-holes for passage through of the shafts or bearing surfaces 20 of the planetary gear wheels. In accordance with the example shown the planetary gear wheel shafts are formed integrally with the planetary gear wheels but obviously the shafts could equally well consist of separate pins penetrating through the planetary gear wheels.

In accordance with FIG. 2 the planetary gear carriers 19 of resilient material could be shaped as a three-pointed cross and with such a configuration that their mutual spacing is larger in the area closest to the center shaft 16 than in the area of the planetary gear wheels. Because the planetary gear carriers centrally are squeezed between the shoulder 16*b* of the center shaft and the shoulder 18*b* formed on the hand wheel hub the planetary gear wheels are positively retained in the correct position with respect to the ring gears of the two pivot components while at the same time the planetary gear carriers tend to move the planetary gear wheels outwards, radially, and thus to urge them into contact with the ring gears. Owing to the thus created outwardly directed pressure exerted on the planetary gear wheels any play between the gears of the two pivot components 1 and 2 thus is efficiently eliminated, resulting in extremely precise setting conditions and an almost negligible risk of movement of the pivot components with respect to one another when exposed to load. If the pivot fitting is to be installed on a vehicle seat the enlarged portion 16*a* of the center shaft preferably could be formed with an internal polygonal, preferably hexagonal recess in which may engage one end of an interconnecting rod extending to a pivot fitting positioned on the opposite side of the seat.

The pivot fitting described in the aforegoing functions in the following manner. When the hand wheel 18 is turned, the engagement of the sun gear wheel 19 with the planetary gear wheels 7 forces the planetary gear wheels to roll along the gear tracks of the pivot components 1 and 2, and owing to the mutual differences in the nature of the gear tracks of the pivot components the latter will move with respect to one another for the purpose of setting the desired angular position. As already mentioned, the resilient planetary gear carriers 19 tend to maintain the planetary gear wheels pressed against their respective gear track of the associated pivot component. It is possible to adjust this pressure by suitable adaptation of the spacing between the two shoulders 16*a* and 18*b*. This adaptation could likewise be effected by tightening the nut 17 to a larger or smaller extent or by inserting suitable washers between the nut and its face of abutment on the hand wheel.

Figure 3:
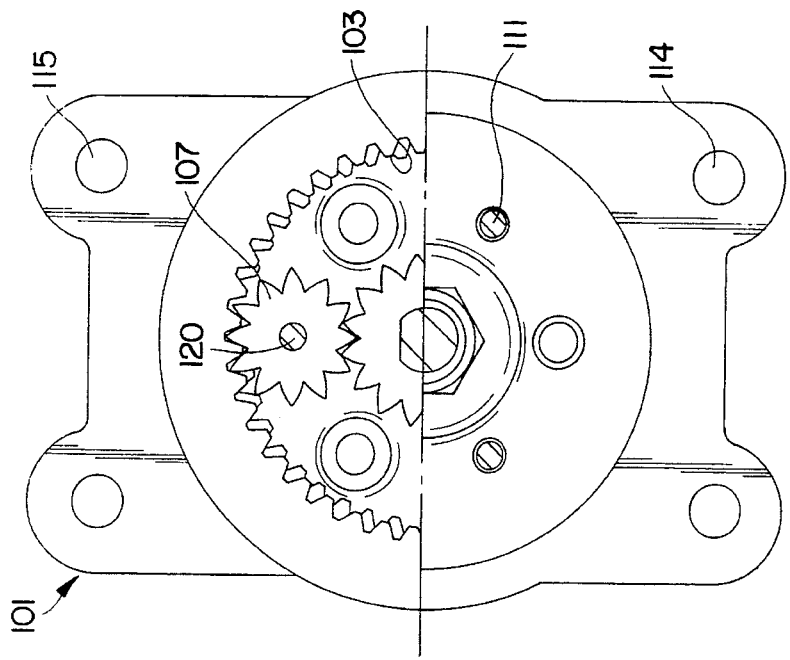
FIG. 3 is a view as seen from the same direction as FIG. 1 but showing a pivot fitting in accordance with a second embodiment, the lower part being shown in a lateral view and the upper one part being partly cut.
Figure 4:
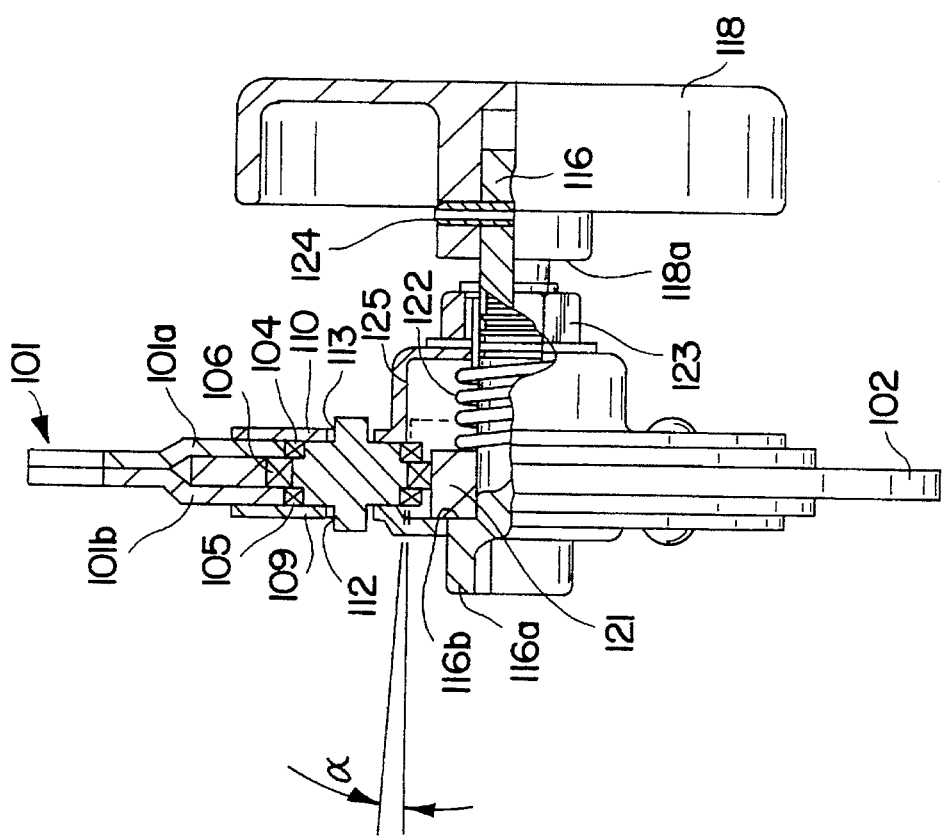
FIG. 4 is a partly cut view, corresponding to FIG. 2, of the fitting of FIG. 3.

In FIGS. 3 and 4 details that essentially correspond to those referred to in the previous drawing figures are given identical numeral references with the addition of 100. For example, one of the pivot components is referred to generally by numeral 101, its two pivot component plates by 101*a* and 101*b*, respectively, and the second pivot component by 102. In addition, the aperture or opening formed in pivot component 102 has been given numeral reference 103, the two ring gears of the pivot component 101 references 104 and 105 and the ring gear of component 2 reference 106. The planetary gear wheels are designated by 107. Spacer means are provided just like in the previous embodiment but are not shown here. On the other hand, the rivets 111 interconnecting them with the respective end discs 109 and 110 are shown. The apertures in which are mounted the planetary gear wheel bearings or shafts 120 in the end discs are designated by 112 and 113, respectively. In addition, the mounting holes of the pivot components are designated by 114 and 115, respectively. In this case, the center shaft is designated by 116, an enlarged portion on one it its ends by 116*a* and the shoulder formed in the transition area between said enlarged portion and the narrower part of the shaft is designated by 116*b*. The hand wheel is designated by 118. Reference numeral 121 designates a sun gear wheel which is non-rotationally mounted on the shaft 116 but so as to be allowed displacement in the axial direction. In this embodiment like in the previous one the planetary gear wheel bearings or shafts 120 are radially movable in spacious apertures 112, 113 formed in the end discs. On the other hand the resilient planetary gear carrier of the previous embodiment has been eliminated in this case. In contrast to the previous example, the end disc 110 is formed with a centrally located, housing-shaped hub 125. Inside the hub 125 is accommodated a compression spring 122 which is held between the inner face of the hub portion and the sun gear wheel 121. In addition, a nut 123 cooperates with threads formed on the shaft 116 and abuts against the outer face of the hub portion 125. In the subject example, the hand wheel hub is designated by 118a. Further, the hand wheel is attached to the shaft by means of a locking pin 124 extending through the wheel hub and shaft. The cogged periphery of the sun gear wheel 121 is slightly conical, as indicated by a in FIG. 4. This means that the operative circumference of the sun gear wheel against the planetary gear wheels increases as the sun gear wheel is displaced to the right relatively to the planetary gear wheels. The spring 122 tends to urge the sun gear wheel to the left, i.e. into abutment against the shoulder 116b. As the nut 123 is tightened against the housing 125 the shoulder 116b is displaced to the right while the compression spring 122 is being compressed. The displacement thus obtained increases the active diameter of the sun gear wheel and in consequence thereof the planetary gear wheels are pressed outwards, against the races formed by the ring gears in the pivot components 101 and 102. By means of the nut 123 it thus becomes possible to regulate the force of abutment or pressure of the planetary gear wheels in contact with the associated ring gears.

The function otherwise agrees with that described with respect to the previous embodiment.

Figure 5:
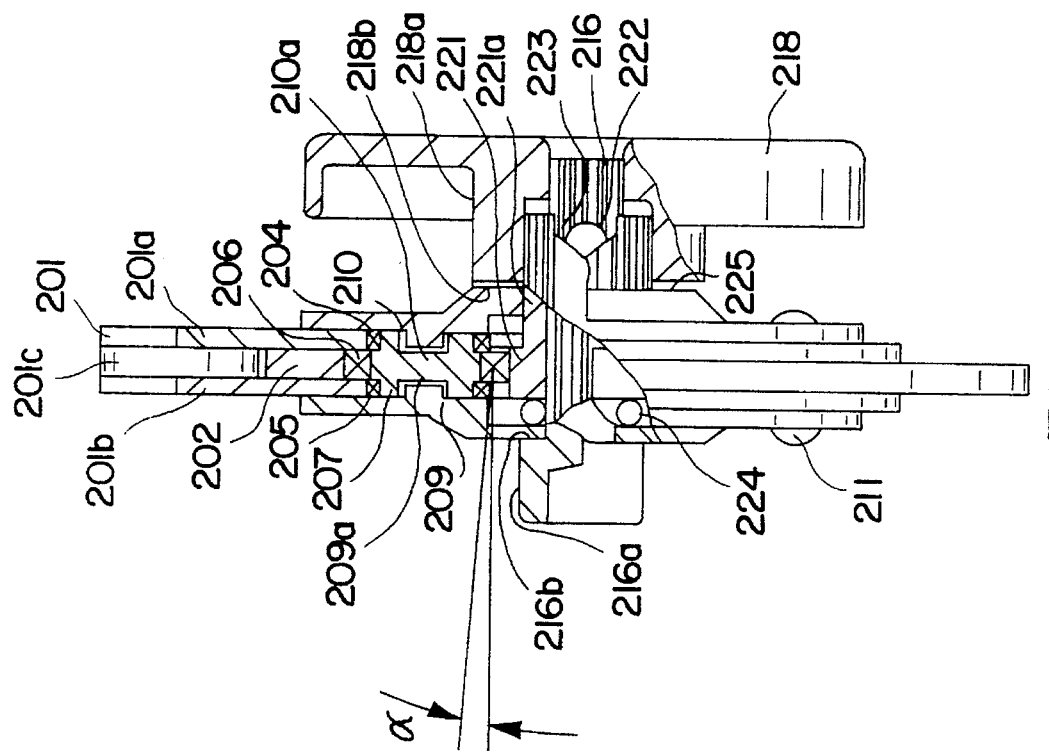
FIG. 5 is a partly cut view, corresponding to FIGS. 2 and 4, of a pivot fitting in accordance with a somewhat different embodiment.

In FIG. 5 the details that are equivalent to those described with reference to the embodiment of FIGS. 1 and 2 have been given the same numeral reference with the exception of the addition of 200. For instance, the two pivot components are designated by 210 and 202, respectively. The two-part plates of the pivot component 201 thus are designated 201a and 201b, respectively. The ring gears formed in the pivot components are designated by 204, 205 and 206. In addition, the planetary gear wheels are designated by 207. The spacer means that are suitable for maintaining the spacing between the end discs 209 and 210 are not shown in this embodiment. Preferably, the end discs are kept together by rivets 211 passing through the spacer means. The center shaft is designated by 216. Like in the previous case, the center shaft is formed with an enlarged portion 216a having a shoulder 216b thereon. In addition, the hand wheel is designated by 218 and the wheel hub by 218a. Reference 218b designates a shoulder formed by the free end of the wheel hub. By reference 201e is designated a spacer means arranged for the purpose of maintaining the mutual spacing between the discs 201a and 201b so as to ensure that they may extend in parallel over their entire longitudinal extension. The subject embodiment is distinguished from the previous ones essentially in that the planetary gear wheels 207 have no center shaft. Instead, the end discs 209 and 210 are provided with inwardly extending projections 209a and 210a, respectively, penetrating into corresponding central depressions formed in the planetary gear wheels. The projections then have a somewhat smaller radial extension than have the recesses in the planetary gear wheels, allowing the latter to perform a limited radial movement. Reference numeral 221 designates a sun gear wheel formed with a sleeve 221a which passes through the end disc 210 and which projects into the hub 218a of the hand wheel. Reference 222 designates a transverse pin passing through the wheel hub 218a and interconnecting the hand wheel and the center shaft 216. In addition, a depression 223 is formed in the sleeve 221a, preferably on each one of the oppositely positioned sides thereof, the width of said depressions tapering towards the depression bottom, which means that the depression forms an oblique plane on which the pin 222 may slide upon turning movement of the hand wheel. The shoulder 216b rests against the external face of the end disc 209. A spring 224 is held between the inner face of the same end disc and the sun gear wheel 221, said spring acting in the axial direction on the sun gear wheel, the latter like the wheel in the previous example, having a conical configuration indicated by a in the drawing. A spacer washer 225 is arranged intermediate the hand wheel and the end disc 210. The compression spring 224 tends to urge the sun gear wheel and consequently the sleeve 221a of the latter to the right as seen in the drawing, which means that the sun gear wheel presses the planetary gear wheels in the radial direction against their associated one of the ring gears in the pivot components 101 and 102. Upon turning movement of the hand wheel the pin 222 will slide towards the sloping planes in the depression 223, displacing the sun gear wheel to the left while compressing the spring 224. Owing to this axial movement of the sun gear wheel the pressure on the planetary gear wheels will lessen with consequential reduction to a minimum of the frictional forces involved upon angular setting of the two pivot components. On the other hand, when the hand wheel is released the sun gear wheel returns to its pressure-exerting position and the interconnection, free of play, between the two pivot components is efficiently re-established.

Figure 6:
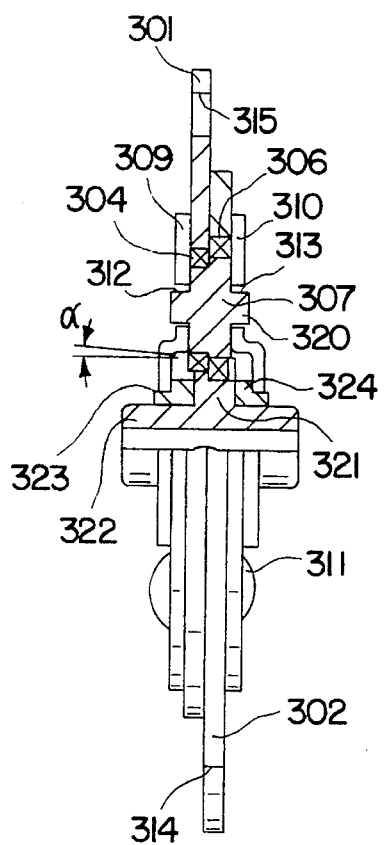
FIG. 6 is a partly cut end view corresponding to another embodiment of a pivot fitting in accordance with the present invention.

In the same manner as in the previous examples the details of FIG. 6 that are functionally identical with those of FIGS. 1 and 2 have received the same numeral reference with the addition of 300. For instance, the upper pivot component is designated by 301, the lower pivot component by 302 and the planetary gear wheels are designated by 307. In addition, the two end discs are designated by 309 and 310, respectively. The ring gear formed in pivot component 301 is designated by 304 and the ring gear of pivot component 302 by 306. The shafts of the planetary gear wheels are designated by 320. Reference 321 designates a sun gear wheel formed as a single piece integrally with a sleeve 322, the latter projecting externally of the end discs 309 and Numeral references 323 and 324 designate spacer rings chosen to ensure a suitable spacing from the inner face of the associated end disc to the sun gear wheel. The sun gear wheel is conical also in accordance with this embodiment, as indicated by a in the drawing. Owing to this configuration the axial displacement of the sun gear wheel and the consequential pressure of the planetary gear wheels against the associated ring gears is determined by the choice of the axial extension of the spacer rings 323 and 324, respectively. Also in accordance with the embodiment illustrated in FIG. 6 the mutual distance between the end discs 309 and 310 preferably is maintained by means of spacer means which are not visible in this drawing figure but could correspond e.g. to the spacer means 8 of FIG. 1. The various details are also in this case kept together by means of suitable interconnection means, such as the rivet 311 illustrated in the drawing. The relative turning movement of the two pivot components preferably is effected by means of a rod-shaped member inserted into the sleeve 322 and secured to a hand wheel or other actuating means, for instance a motor-operated device, or else the pivot fitting in accordance with FIG. 6 could be arranged on the side of the seat opposite to the one where the hand wheel is mounted. For instance, the pivot fitting could be interconnected with a pivot fitting of the kind illustrated in FIG. 7, but the second pivot fitting could also be entirely identical to that shown in FIG. 6. Numeral references 312 and 313 refer to the apertures having a radial space in which the planetary gear wheels are mounted, just like in the previous examples. The two attachment apertures of the two pivot components are designated by 314 and 315, respectively, in accordance with this embodiment.

Figure 7:
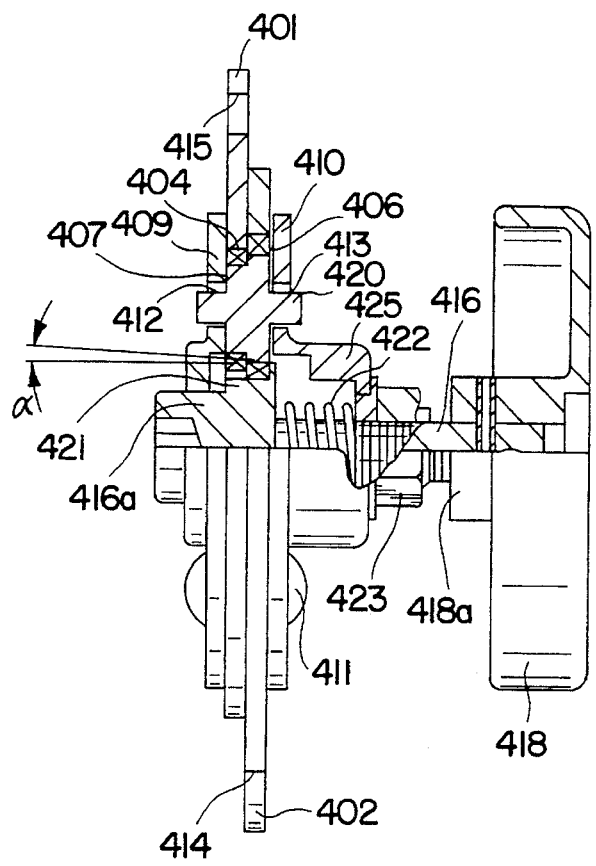
FIG. 7 is a partly cut end view corresponding to yet another embodiment of a pivot fitting in accordance with the present invention.

In FIG. 7 details corresponding to those appearing in FIGS. 1 and 2 have received the same numeral references with the addition of 400. For instance, the upper pivot component is designated by 401, the lower pivot component by 402 and the planetary gear wheels by 407. In addition, the ring gear formed in pivot component 401 is designated by 404 and the ring gear of component 402 by 406. Numeral references 409 and 410 designate two end discs spaced mutually apart by means of suitable spacer means through which pass suitable interconnection means such as the rivet 411 just like in the previous examples. Just like end disc 110 in FIG. 4, end disc 410 has a hub portion 425 in the shape of a housing in which is accommodated a compression spring 422. An adjusting nut 423 is pressed against the external face of the hub portion. A central shaft 416 is formed with an enlarged end portion 416a which is formed integrally with a sun gear wheel 421. Numeral reference 418 designates a hand wheel 418 the hub 418a of which is nonrotationally connected to the shaft 416 by means of a transverse pin 424. Also in accordance with this embodiment the sun gear wheel has a conical configuration as indicated by a in FIG. 7. As a result of this configuration tightening of the nut 423 will cause the sun gear wheel 421 to move to the right as seen in the drawing figure, just like in accordance with the embodiment of FIG. 4, and consequently the planetary gear wheels will be pressed against their associated ring gears. Numerals 412 and 413 designate the radially spacious apertures formed in the respective end discs 409, 410 through which extend the planetary gear wheel shafts or bearings 420. The attachment apertures in the two pivot components are designated by 414 and 415, respectively.

Figure 8:
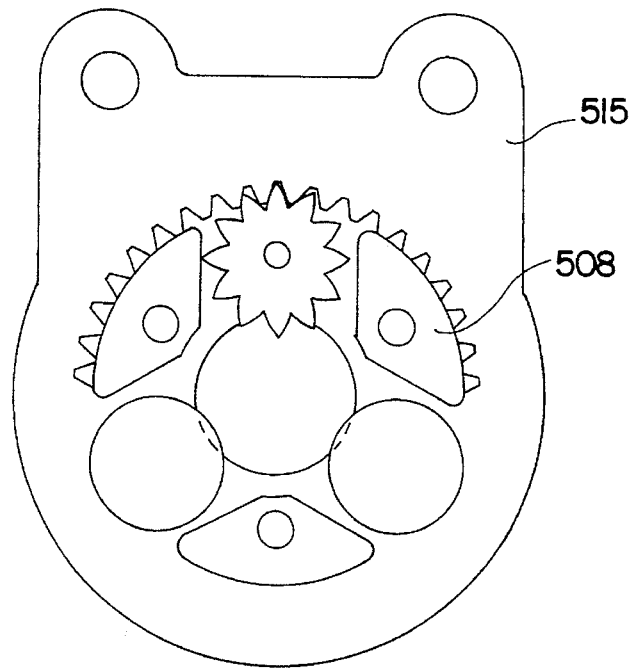
FIG. 8 is a schematical representation showing the principles of yet another pivot fitting as seen from the front view as that in FIGS. 1 and 3, but shown in more detail.
Figure 9:
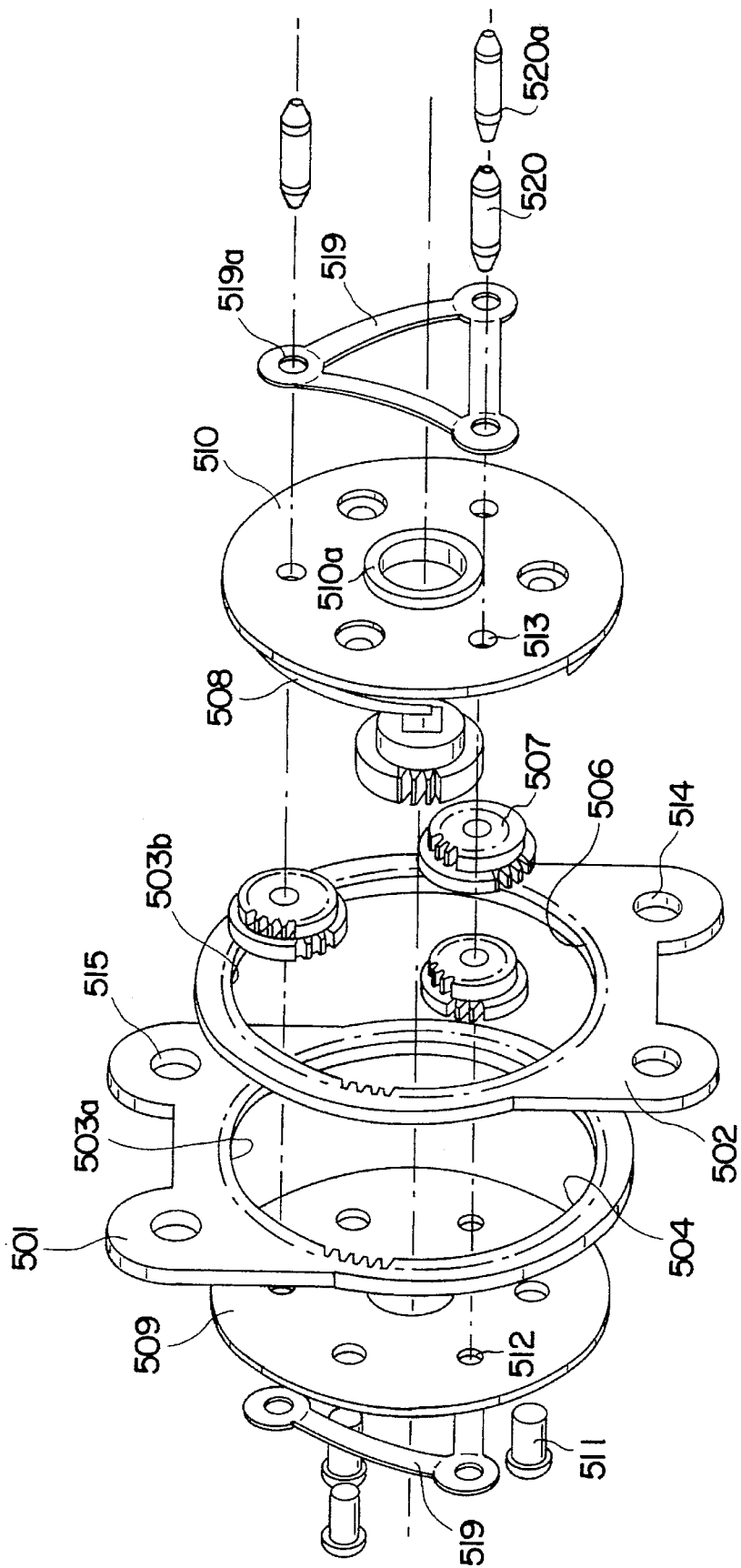
FIG. 9 is an exploded view of a fitting in accordance with the embodiment of FIG. 8.
Figure 10:
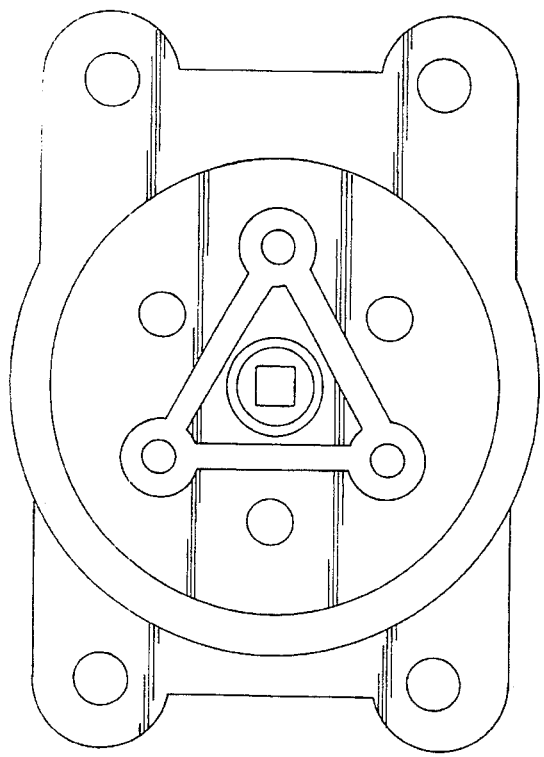
FIG. 10 is a lateral view of the fitting in FIGS. 8 and 9.
Figure 11:
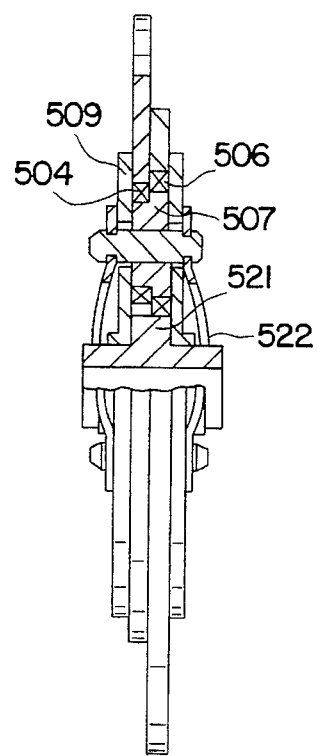
FIG. 11 is a partly cut view as seen from the right-hand side in FIG. 10, of the same fitting.

In the same manner as in the previous embodiments, details corresponding to those in FIGS. 1 and 2 have received the same numeral references in FIGS. 8–12 with the exception that 500 has been added. Consequently, an upper pivot component is designated by 501 and the lower pivot component by 502. Planetary gear wheel mounting apertures formed in the two pivot components are designated by 503a and 503b, respectively. Numeral reference 504 designates the ring gear formed in pivot component 501 and numeral reference 506 designates the ring gear formed in pivot component 502. Reference 507 designates the planetary gear wheels acting against the ring gears, references 509 and 510 the end discs positioned externally of the pivot components 501 and 502. Rivets 511 or similar means keep the end discs together and extend through spacer means 508. Numeral references 512 and 513 are used to designate radially spacious apertures formed in the two end discs and through which extend the shafts or bearings 520 of the planetary gear wheels. Reference 521 designates a sun gear wheel which is formed integrally with a sleeve 522 extending through central bearing members 509a and 510a respectively, arranged in the end discs. Attachment apertures in the two pivot components are designated by 514 and 515, respectively. Two planetary gear carriers 519 are respectively positioned one on each external face of the two end discs. In accordance with the embodiment shown the two planetary gear carriers 519 are shaped essentially as an equilateral triangle the corners of which are apertured at 519a and the sides of which are somewhat curved to allow the apertures to be compressed radially while making use of the resilient nature of the material. FIG. 11 shows how the planetary gear wheel shafts 520 extend through the end discs 509, 510 and the planetary gear wheels 507. Externally of the end discs the planetary gear wheel shafts are formed with grooves 520a. By means of their apertures 519a the resilient planetary gear carriers 519 are fitted into the grooves 520a while radially compressed, as most clearly apparent from FIG. 11. The radial compression of the planetary gear carriers tends to keep the planetary gear wheels pressed outwardly into abutment against their associated ring gear, thus preventing the occurrence of play between the pivot components. The relative position of the various parts also appears from the exploded view of FIG. 9. In the non-round center aperture preferably could be inserted a shaft which is condected with a hand wheel or other means suitable to effect the sun gear wheel turning movement and consequently the mutual setting of the pivot components. FIG. 8 shows the way the spacer means 508 follow the circle formed by the ring gear cog apices, thus forming a sliding face for the centering of the two pivot components relative to one another.

Figure 12:
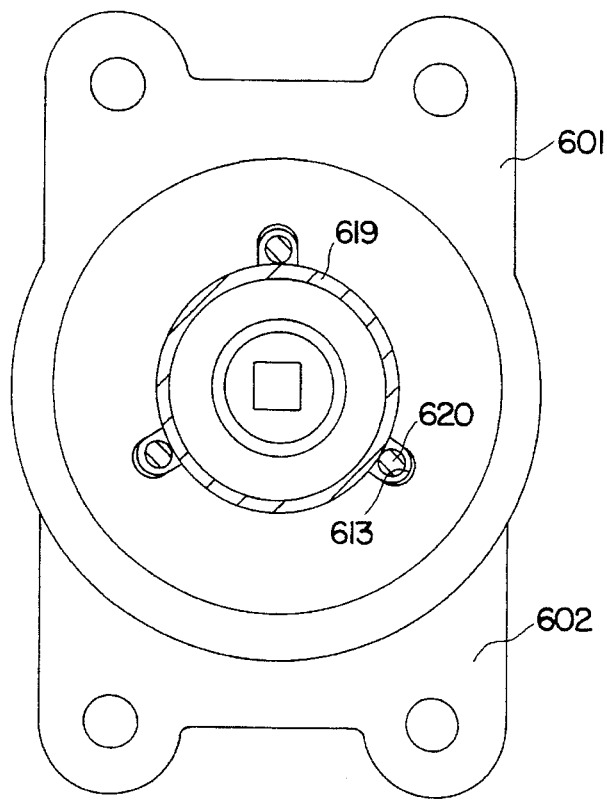
FIG. 12 is a view corresponding to FIG. 10, of a pivot fitting in accordance with yet another embodiment.
Figure 13:
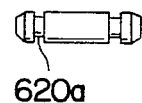
FIG. 13 illustrates a component incorporated in the fitting of FIG. 12.

The pivot fitting illustrated in FIGS. 12 and 13 is a modification of the pivot fitting illustrated in FIGS. 8–11, the difference being that the triangular planetary gear carrier is replaced by an annular member 619 of a resilient material. In the areas of the planetary gear wheel shafts 620 the annular member is somewhat compressed radially and inserted into the grooves 620a formed in the planetary gear wheel shafts. Just like in the previous example the planenary gear wheel shafts are carried through spacious apertures 613 formed in the end discs. Because the annular member 619, owing to its resiliency, tends to resume its circular shape it exerts pressure on the planetary gear wheel shafts 620 and consequently on the planetary gear wheels, not visible on the drawing figure, moving them outwards against their associated one of the ring gears in the same manner as in the preceding examples. Upon turning movement of the planetary gear wheel shafts 620 the bottom of their grooves 620a will form a race on which the annular member 619 slides, with the result that the wear on the contacting surfaces of the planetary gear carriers 619 and the planetary gear wheel shafts 620 are reduced to a minimum. The annular spring 619 could have any cross-sectional shape, for instance circular or square or rectangular but also other cross-sectional configurations are possible without departure from the inventive idea.

A number of various embodiments have been described in the aforegoing. However, the invention is not limited to these embodiments which could be modified as to their details without departing from the inventive idea. The invention is primarily intended to be used in connection with vehicle seats but a more general application of the invention is equally possible whenever one wishes to interconnect two parts by means of an articulated precision joint.

What is claimed is:

1. A device for pivotably setting a relative position of a first and a second pivotable element, comprising:

first and second driving components each having a plate-like configuration of a like thickness, and including coaxially aligned circular openings therein, each of said openings respectively defining a toothed periphery which forms a ring gear, each of said driving components circularly rotatable with respect to one another about a common and stationary axis, one of said ring gears having a larger diameter than the other;

a sun gear spaced interiorly coaxially of said ring gears and circularly rotatable about said common axis;

means for rotating said sun gear, said means disposed along said common axis and having said sun gear fixedly attached thereto;

at least one planetary wheel gear, each of said planetary gears simultaneously enmeshed with said sun gear and each of said ring gears, each of said planetary wheel gears rotating about a respective axis, each of which is parallel to said common axis, each of said planetary wheel gear axis rotating circularly about said common axis as each said planetary wheel gear is rotatably driven, thereby rotating said ring gears and said first and second driven components coaxially with respect to one another;

spacing means disposed between said driving components for maintaining a separation distance therebetween, said spacing means interposed between each of said planetary wheel gears;

a pair of circular end discs coupled to each other, one said disc associated with said first driving component and the other said disc associated with said second component, said end disc arranged to enclose a respective said opening on said driving component, whereby said sun gear and said planetary wheel gears are retained interiorly of said ring gears:

cylindrically configured bearing means for respectively supporting each of said planetary wheel gears along an axial direction, each of said bearing means of a like diameter and axially centered about its associated and respective planetary wheel gear axis, each of said bearing means extending between said end discs and received within a respective opening provided in each of said discs, said openings of a diameter larger than said diameter of said bearing means in order to provide limited radial movement of each bearing means from its respective planetary wheel gear axis; and means for simultaneously biasing each of said planetary gears radially outward into continuous enmeshed contact with each of said ring gears when said rotating means is acted upon, said biasing means continually eliminating any free slack between said planetary and ring gears.

2. The device as claimed in claim 1, characterized in that the planet carriers are configured as annular members formed with holes therein for receiving said bearing means, said bearing means spaced around the annular member periphery.

3. The device as claimed in claim 1, characterized in that said planet carriers are formed as a circular ring-shaped resilient member having a periphery, said periphery biased into nesting engagement with a set of grooves formed in an end portion of the planet wheel shafts.

4. The device as claimed in claim 1, characterized in that the pivot components are disc-shaped fittings arranged in abutting relationship and having one each of two concentric apertures the respective periphery of which forms the associated gear rim, the two disc-shaped fittings being restrained one against the other by means of end plates, arranged in abutment against its associated one of external flat faces and kept together by means of spacer members positioned between the planet wheels and bridging the thickness of the fittings.

5. The device as claimed in claim 4, characterized in that the spacer members are formed with external faces in abutment against the gear rim tooth apices and forming sliding tracks on which slide said apices for the purpose of maintaining the concentric relationship of the gear tracks.

6. The device as claimed in claim 1, characterized in that the resilient planet wheel carriers are arranged externally of the end, discs and that the grooves in the planet wheel shafts are formed in shaft end portions projecting axially through the end plates.

7. The device of claim 1 wherein said rotating means is comprised of a rotatable shaft centrally disposed along an axial direction through said openings, said shaft having a left side and a threaded right side, said left side comprised of an enlarged portion, a narrow portion, and a shoulder therebetween.

8. The device of claim 7 wherein said biasing means is comprised of a handle secured to said right of said shaft by a nut, said handle having a hub portion that defines a shoulder, said shoulder of said shaft and said shoulder of said biasing means radially biasing said planetary gear wheels outward against said ring gears when said wheel is operably turned so as to cause said wheel hub to displace towards said shaft left side.

9. The device of claim 7, wherein said biasing means is comprised of a handle secured to said right side of said shaft and a hub housing disposed between said handle and said end disc, said hub housing enclosing a helical spring disposed about said shaft, said spring axially displaced when a nut is advanced against said housing hub, whereby said housing hub is displaced radially outward into contact with said planetary gears, thereby radially displacing said gears outward against said ring gears.

* * * * *